United States Patent
Kanazawa et al.

(10) Patent No.: US 9,405,443 B2
(45) Date of Patent: Aug. 2, 2016

(54) OBJECT DISPLAY APPARATUS, OPERATION CONTROL METHOD AND NON-TRANSITORY COMPUTER-READABLE STORAGE MEDIUM

(71) Applicant: Konica Minolta, Inc., Chiyoda-ku (JP)

(72) Inventors: Ikuko Kanazawa, Kunitachi (JP); Shinya Ogino, Machida (JP); Shunsuke Takamura, Kokubunji (JP); Noriko Hoshino, Kokubunji (JP); Toshihiro Motoi, Toshima-ku (JP); Takao Shudo, Chofu (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 192 days.

(21) Appl. No.: 14/206,107

(22) Filed: Mar. 12, 2014

(65) Prior Publication Data

US 2014/0282017 A1  Sep. 18, 2014

(30) Foreign Application Priority Data

Mar. 15, 2013 (JP) ................................. 2013-052972

(51) Int. Cl.
*G06F 3/0484* (2013.01)
*G06F 3/01* (2006.01)

(52) U.S. Cl.
CPC .............. *G06F 3/0484* (2013.01); *G06F 3/013* (2013.01); *G06F 3/04845* (2013.01)

(58) Field of Classification Search
CPC .... G06F 3/0484; G06F 3/013; G06F 3/04845
USPC ........................................................ 715/733
See application file for complete search history.

(56) References Cited

U.S. PATENT DOCUMENTS

2005/0183035 A1  8/2005  Ringel et al.
2010/0269072 A1  10/2010  Sakata et al.
(Continued)

FOREIGN PATENT DOCUMENTS

JP   2005196740      7/2005
JP   2007-272365 A   10/2007
(Continued)

OTHER PUBLICATIONS

Notification of Reasons for Refusal issued in corresponding Japanese Patent Application No. 2013-052972; dated Oct. 16, 2015, and English translation thereof.(6 pages).
(Continued)

*Primary Examiner* — William Bashore
*Assistant Examiner* — Gregory A Distefano
(74) *Attorney, Agent, or Firm* — Buchanan Ingersoll & Rooney PC

(57) ABSTRACT

An object display apparatus includes: a display section; an operating section configured to allow one or more operators to operate objects displayed on the display section; and a work-type determining section configured to set an operation mode to a group mode or a personal mode. The object display apparatus further includes an object assigning section configured to assign a corresponding object to each of the operators, on the operation mode being set to the personal mode; and an operation control section configured to, on the operation mode being set to the personal mode, determine whether an operation performed on one of the objects by one of the operators can affect a display state of another object assigned to another operator, and control the operation with putting a limit on the operation, in response to determining that the operation can affect the display state of the another object.

18 Claims, 9 Drawing Sheets

(56) References Cited

U.S. PATENT DOCUMENTS

| | | | | |
|---|---|---|---|---|
| 2010/0306004 | A1* | 12/2010 | Burtner | G06Q 10/10 705/301 |
| 2011/0025712 | A1* | 2/2011 | Ikeda | G06F 3/0488 345/635 |
| 2011/0047478 | A1* | 2/2011 | Ellsworth | G06F 9/543 715/747 |
| 2014/0223335 | A1* | 8/2014 | Pearson | H04L 65/403 715/753 |
| 2014/0313129 | A1* | 10/2014 | Elvesjo | G06F 1/3287 345/156 |

FOREIGN PATENT DOCUMENTS

| | | | | |
|---|---|---|---|---|
| JP | 2010-026327 | A | 2/2010 | |
| JP | 2010026327 | A1 * | 2/2010 | G09G 5/00 |
| WO | WO 2010/021240 | A1 | 2/2010 | |
| WO | 2010-035477 | A1 | 4/2010 | |

OTHER PUBLICATIONS

Office Action (Notification of Reasons for Refusal) issued on Mar. 20, 2015, by the Japanese Patent Office in corresponding Japanese Patent Application No. 2013-052972, and an English Translation of the Office Action. (6 pages).

* cited by examiner

OBJECT DISPLAY APPARATUS, OPERATION CONTROL METHOD AND NON-TRANSITORY COMPUTER-READABLE STORAGE MEDIUM

This application is based on Japanese Patent Application No. 2013-052972 filed on Mar. 15, 2013, in the Japan Patent Office, the entire content of which is hereby incorporated by reference.

TECHNICAL FIELD

The present invention relates to an object display apparatus, an operation control method, and a non-transitory computer-readable storage medium storing an operation control program therein. Particularly, the present invention relates to an object display apparatus which allows plural operators to operate objects, an operation control method to be used in the object display apparatus, and a non-transitory computer-readable storage medium storing an operation control program to be executed in the object display apparatus.

BACKGROUND

There have been proposed display systems which allow plural users to conduct operations on one screen. With regard to the display systems, International Patent Publication No. WO2010/021240 discloses the following image display apparatus. The image display apparatus includes a display section for displaying objects, a detecting section configured to automatically detect a conflict among plural users about operations to be performed on an object displayed on the display screen. The image display apparatus further includes a processing section configured to, in response to a detection of the conflict carried out with the detecting section, enlarge an object on which the conflict has arisen or move an object on which the conflict has arisen to a common display area of the display section to adjust the orientation of the moved object. Under the situation that plural users conduct a discussion based on one material (one object) displayed thereon, the image display apparatus conducts a control such that the users can view the material easily.

Though International Patent Publication No. WO2010/021240 describes about a stage that plural users conduct a discussion together (referred as a group work), such a discussion held by plural users further has a stage that each of the users individually considers about the discussion (referred as a personal work), additionally to the group work. It is preferable that a display system has operation modes (a personal mode and a group mode) in each of which users can work in a manner suitable to either of those stages.

An influence of an operation on a certain object to another object in each of the personal mode and the group mode can be considered as follows. In the group work, all the operators keep their eyes on an object as an operation target, and every operator recognizes how the object will be operated. Therefore, such the situation does not cause a problem about the influence of an operation on the object to another object.

On the other hand, in the personal work, each of the operators gives attention to objects separately and not every operator recognizes how one of the objects will be operated. Therefore, when a certain operator performs an operation on an object, the operation can affect another object, which sometimes disturbs an operation of another operator. For example, when an object enlarged by a certain operator overlaps with another object to which another operator gives attention, such the operation can disturb operations and considerations to be conducted by another operator. To solve that, under the situation that each of the operators is working individually, it is required to control operations of operators on objects such that an object operation performed by each of the operators does not affect the display state of another object to which another operator gives attention.

As a method of an operation control so as not to affect the display state of another object to which another operator gives attention, there can be considered a method to divide a working area into pieces for respective operators. However, each of the operators hardly passes and receives objects across the border of their working area, which results in limitation of their operation contents. In view of that, a way to control operations such that an object operation performed by each operator does not affect the display state of another object to which another operator gives attention, without dividing the working area, is now desired. The present invention seeks to solve the problem.

SUMMARY

There are disclosed illustrative object display apparatuses, operation control methods and non-transitory computer-readable storage media each storing a control program.

An object display apparatus reflecting one aspect of the present invention is an object display apparatus comprising: a display section configured to display objects thereon; and an operating section configured to allow one or a plurality of operators to operate the objects displayed on the display section. The object display apparatus further comprises a work-type determining section configured to set an operation mode of the object display apparatus to one of a group mode and a personal mode by determining whether the one or the plurality of operators are conducting a group work on one object displayed on the display section or each of a plurality of operators is conducting a personal work on a corresponding object displayed on the display section. The object display apparatus further comprises an object assigning section configured to assign a corresponding object displayed on the display section to each of the plurality of operators, on the operation mode being set to the personal mode. The object display apparatus further comprises an operation control section configured to, on the operation mode being set to the personal mode, determine whether an operation performed on one of the objects displayed on the display section by one of the plurality of operators can affect a display state of another object assigned to another of the plurality of operators, and control the operation performed by the one of the plurality of operators with putting a limit on the operation, in response to determining that the operation can affect the display state of the another object.

An operation control method reflecting one aspect of the present invention is an operation control method to be performed in an object display apparatus including a display section configured to display objects thereon and an operating section configured to allow one or a plurality of operators to operate the objects displayed on the display section. The method comprises: setting an operation mode of the object display apparatus to one of a group mode and a personal mode by determining whether the one or the plurality of operators are conducting a group work on one object displayed on the display section or each of a plurality of operators is conducting a personal work on a corresponding object displayed on the display section. The method further comprises assigning a corresponding object displayed on the display section to each of the plurality of operators, on the operation mode being set to the personal mode. The method further comprises, on the operation mode being set to the personal mode, determining whether an operation performed on one of the objects displayed on the display section by one of the plurality of operators can affect a display state of another object assigned to another of the plurality of operators, and controlling the operation performed by the one of the plurality of operators with putting a limit on the operation, in response to determining that the operation can affect the display state of the another object.

A non-transitory computer-readable storage medium reflecting one aspect of the present invention stores an operation control program to be executed in an object control apparatus. The object control apparatus includes a display section configured to display objects thereon and an operating section configured to allow one or a plurality of operators to operate the objects displayed on the display section. The operation control program causes a processor of the object display apparatus to execute the following processing. The processing comprises: setting an operation mode of the object display apparatus to one of a group mode and a personal mode by determining whether the one or the plurality of operators are conducting a group work on one object displayed on the display section or each of a plurality of operators is conducting a personal work on a corresponding object displayed on the display section. The processing further comprises assigning a corresponding object displayed on the display section to each of the plurality of operators, on the operation mode being set to the personal mode. The processing further comprises, on the operation mode being set to the personal mode, determining whether an operation performed on one of the objects displayed on the display section by one of the plurality of operators can affect a display state of another object assigned to another of the plurality of operators, and controlling the operation performed by the one of the plurality of operators with putting a limit on the operation, in response to determining that the operation can affect the display state of the another object.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Figure 1A:
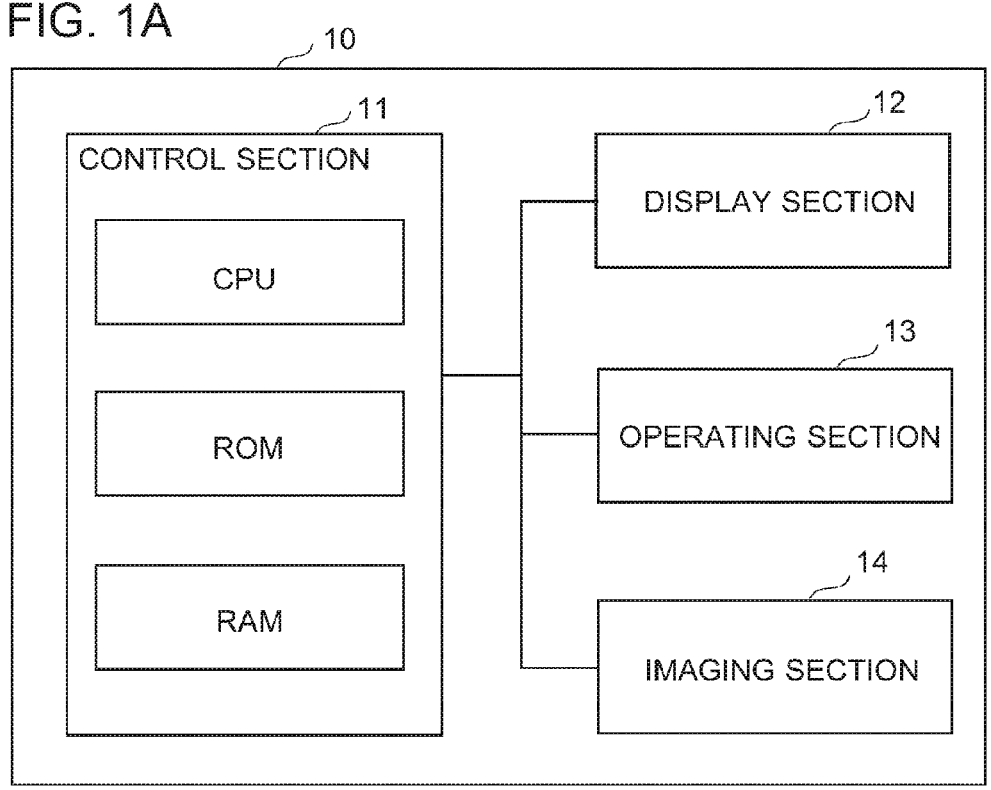
FIGS. 1A and 1B are block diagrams illustrating a structure of an object display apparatus relating to one embodiment of the present invention.

Illustrative embodiments of object display apparatuses, operation control methods and non-transitory computer-readable media each storing an operation control program will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the object display apparatuses, operation control methods and non-transitory computer-readable media each storing an operation control program as the illustrative embodiments, there is no need to divide the working area into pieces for respective operators and each operator can conduct their operation on an object without affecting the display states of an object of another operator.

The reason is that there is provided an object display apparatus which can display objects thereon and conduct operations on the objects and that the object display apparatus includes a structure configured to conduct the following control. The operation mode of the object display apparatus is switched to one of a group mode and a personal mode from the other by determining whether one or plural operators are conducting a group work on an object or each of plural operators is conducting a personal work on a corresponding object. In case of the personal mode, a corresponding object displayed on the display section is assigned to each of the plural operators, and it is determined whether an operation performed on an object by one of the plural operators can affect the display state of another object assigned to another of the plural operators. In response to determining that the operation can affect the display state of the another object, the operation performed by the one of the plural operators is controlled with putting a limit on the operation.

As illustrated in the description about the background, a display system which allows plural operators to conduct operations on one screen, preferably has an operating mode suitable to a stage that each operator individually considers (a personal work) and an operating mode suitable to a stage that operators have a discussion together (a group work). The International Patent Publication No. WO2010/021240 has proposed a way to control a material displayed on the apparatus to be easily shown by plural users in the group mode.

In the group work discussed in the International Patent Publication No. WO2010/021240, all the operators give attention to the object as a common operation target. Such the situation does not cause a problem about the influence of the object operation to another object. However, in the personal work, each of the operators gives attention to objects separately. Therefore, when a certain operator performs an operation on an object, the operation can affect another object, which sometimes disturbs operations and considerations of another operator. To solve that, there can be considered a way to divide a working area into pieces for respective operators. However, each of the operators hardly passes and receives objects across the border of their working area, which results in limitation of their operation contents.

In view of that, an object display control apparatus as an embodiment of the present invention includes a structure configured to conduct the following processing. The processing includes setting an operation mode of the object display apparatus to one of a group mode and a personal mode according to a determination that a group work or a personal work is conducted; assigning a corresponding object to each of plural operators in case of the personal mode; determining whether an operation performed on one of objects by one of the plural operators can affect a display state of another object assigned to another of the plural operators, and in response to determining that the operation can affect the display state of the another object, controlling the operation performed by the one of the plural operators with putting a limit on the operation, for example, so as to give priority to the display state of the another object.

By employing this control, there is no need to divide the working area in the apparatus and the object display apparatus allows each operator to operate an object without affecting the display states of another object assigned to another operator.

EXAMPLE

Figure 1B:
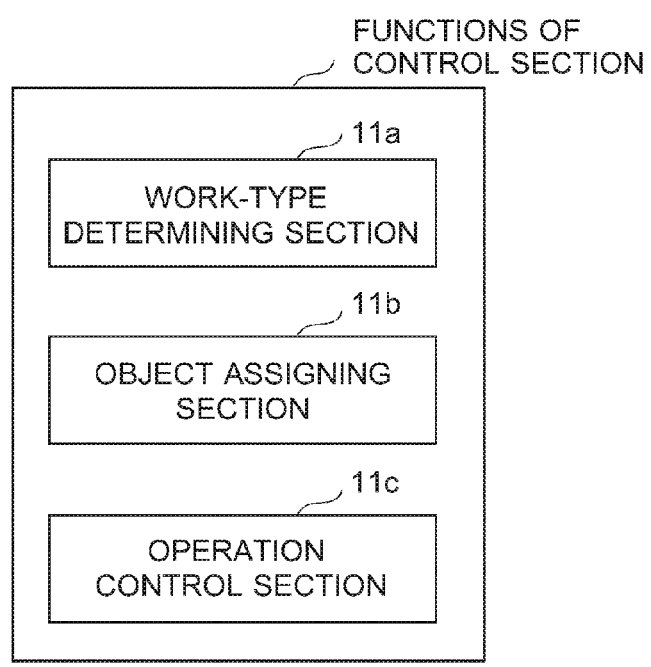

In order to describe the above-mentioned embodiments in more detail, description will be given to an object display apparatus, an operation control method and a non-transitory computer-readable medium storing an operation control program relating to one example of the present invention with reference to FIGS. 1A to 9I. FIGS. 1A and 1B are block diagrams illustrating a structure of an object display apparatus of the present example. Each of FIGS. 2 to 7 is a flowchart illustrating steps of an operation control method of the present example. FIGS. 8 and 9A to 9I are schematic diagrams illustrating a concrete example of an operation control method of the present example.

In the following descriptions, a group work represents a kind of work such that plural operators operate the same object after they confirmed their operations each other. If one of the operators is going to operate an object in the group work, the operation is recognized by the other operators. Therefore, even under the situation that the operation affects a display state of another object, the operation does not cause a problem.

On the other hand, a personal work represents a kind of work such that each of plural operators operates an object without confirming operations of the other operators. If one of the operators is going to operate an object in the personal work, the operation is not recognized by the other operators. Therefore, under the situation that the operation affects a display state of another object, the operation can disturb operations and considerations of other operators, which causes a conflict of operations.

In view of that, the object display apparatus of the present example has a structure configured to set an operation mode of the object display apparatus to one of a group mode and a personal mode from the other by determining whether one or plural operators are conducting a group work or each of plural operators is conducting a personal work, assign a corresponding object to each of the plural operators in case of the personal mode, and if it is determined that an operation to be performed on an object (a target object) can affect the display state of an object assigned to another operator, control the operation performed with putting a limit on the operation. Concretely, the structure is configured to control the operation on the target object so as not to cause an operation conflict, according to the type of the operation. When there is only one operator, a work conducted by the one operator is assumed as a group work, since such the situation cannot make an operation conflict with the other operators.

The structure of an object display apparatus which can realize the above control will be described below. Object display apparatus 10 of the present example can be provided as an electronic blackboard or a large-sized touch panel and is composed of control section 11, display section 12, operating section 13 and imaging section 14 as shown in FIG. 1A.

Control section 11 includes a CPU (Central Processing Unit) and memories such as a ROM (Read Only Memory) and a RAM (Random Access Memory) as shown in FIG. 1A, and controls general operations of the object display apparatus 10. The control section 11 works so as to realize work-type determining section 11a, object assigning section 11b and operation control section 11c as shown in FIG. 1B.

Work-type determining section 11a is configured to perform the following processing. The work-type determining section 11a extracts parts of each operator, such as an operator's face and an operator's body, from an image taken by imaging section 14 which will be described later, and defines which object the each operator is going to operate based on orientations and movements of the extracted face and body. On defining that all the plural operators are going to operate one and the same object, the work-type determining section 11a determines that the operators are conducting a group work and sets the operation mode of the apparatus to a group mode. On defining that at least one of the plural operators is not going to operate the same object as another operator operates, the work-type determining section 11a determines that each of the operators is conducting a personal work and sets the operation mode of the apparatus to a personal mode.

Concretely, the work-type determining section 11a defines the direction in which the operators are looking, and determines that the operators are conducting a group work on defining that plural operators keep their eyes on the same object for a predetermined period of time. Further, the work-type determining section 11a defines the orientations of faces and bodies of the operators and determines that the operators are conducting a group work on defining that plural operators face the same object for a predetermined period of time. Further, the work-type determining section 11a calculates an angle of view of each of the operators based on the position and orientation of the face and body of the each of the operators and on the distance from the each of the operators to a screen of the display section, and determines whether the operators are conducting a personal work or a group work depending on the size of the area where the angle of view of one operator overlaps with that of another operator.

Object assigning section 11b is configured to, in the personal mode, assign objects displayed on display section 12 to corresponding operators based on signal outputted from operating section 13 and an image outputted from imaging section 14.

Concretely, the object assigning section 11b is configured to obtain information of objects displayed on display section 12 (information defining each object and information of the displayed position of each object) and one of signal outputted from operating section 13 and an image outputted from imaging section 14, and assign various objects to corresponding operators separately based on the information of the objects and the one of the signal and the image, where the various objects include an object which an operator is in contact with for a predetermined period of time, an object on which an operator keeps operator's eyes for a predetermined period of time, an object displayed in an area where an operator can reach the object, and an object being within an area of an angle of view of an operator.

Operation control section 11c is configured to, in the personal mode, define an operation performed on an object based on signal outputted from operating section 13 and an image outputted from imaging section 14, determine whether the operation can affect the display state of another object assigned to another operator or not when the operation is actually conducted on the object, and control the operation with putting a limit on the operation in response to determining that the operation can affect another object. For example, under the situation that the operated object can overlap with another object, the operation control section 11c displays the operated object with giving priority to the another object, moves the operated object to another position so as not to overlap with the another object, or enlarges the operated object at an enlargement rate so as not to overlap with the another object.

Under the situation that there are three or more operators and the work-type determining section 11a determines that at least one of the operators is conducting a personal work, the work-type determining section 11a determines whether each of the other operators excluding the at least one operator who has been determined to be conducting the personal work is an operator who is conducting a personal work or an operator who is conducting a group work. When there are plural operators conducting a group work in the other operators, the work-type determining section 11a determines all the plural operators conducting the group work as operators conducting another personal work, and sets the operation mode of the apparatus to a personal mode. Then, the object assigning section 11b assigns corresponding objects displayed on display section 12 also to the operators conducting the group work. In this situation, even when each of the plural operators conducting the group work operates an object assigned to the another personal work, operation control section 11c determines that the operation corresponds to the group work rather than a personal work. That is, even when operation control section 11c defines an operation conducted by one operator on an object and further determines that the operation can affect the display state of another object assigned to another operator, the operation control section 11c do not limit the operation the as far as the one operator and the another operator are included in the operators conducting the group work.

Examples of the way to define an operation based on signal outputted from operating section 13 are described below. Under the situation that an operator touches a place on display section 12, where no object is displayed, with operator's hand or finger or a pen (assuming as operator's finger in this case), operation control section 11c defines the operation as an instruction to create a new object. Under another situation that an operator touches an object on display section 12 with operator's finger and moves the finger with putting the finger on the object, operation control section 11c defines the operation as an instruction to move the object. Under another situation that an operator touches an object on display section 12 with two operator's fingers and enlarges or reduces the space between the fingers, operation control section 11c defines the operation as an instruction to enlarge or reduce the object. Under another situation that an operator keeps putting operator's finger on an object on display section 12 for a predetermined period of time or flicks operator's finger with putting the finger on the object, operation control section 11c defines the operation as an instruction to delete the object.

Examples of the way to define an operation based on an image outputted from imaging section 14 are described below. Under the situation that an operator points a place on display section 12, at which no object is displayed, by gesture with operator's hand or finger or a pointer (assuming as operator's finger in this case), operation control section 11c defines the operation as an instruction to create a new object. Under another situation that an operator points an object on display section 12 by gesture with operator's finger and then moves the finger so as to change the place pointed by the finger slowly, operation control section 11c defines the operation as an instruction to move the object. Under another situation that an operator points an object on display section 12 by gesture with two operator's fingers and enlarges or reduces the space between the fingers, operation control section 11c defines the operation as an instruction to enlarge or reduce the object. Under another situation that an operator keeps pointing an object on display section 12 by gesture with operator's finger for a predetermined period of time or points an object by gesture with operator's finger and then moves the finger by gesture so as to change the place pointed by the finger quickly, operation control section 11c defines the operation as an instruction to delete the object.

The above work-type determining section 11a, object assigning section 11b and operation control section 11c may be constituted by hardware. Alternatively, there may be provided a software program (an operation control program) which is stored in a non-transitory computer-readable storage medium and cause the control section 11 to works as work-type determining section 11a, object assigning section 11b and operation control section 11c, when the program is executed by the control section 11, as illustrated by FIGS. 1A and 1B.

Display section 12 is composed of a device such as a LCD (Liquid Crystal Display) and an organic EL display, and is configured to display objects such as characters and figures thereon.

Operating section 13 is composed of devices such as a touch sensor including lattice-shaped electrodes arranged on display section 12, a light sensor and hardware keys, and allows an operator to perform various operations such as creation of a new object, movement of a created object, enlargement or reduction of a created object and deletion of a created object, by detecting a touch of operator's hand or finger and a pen on the device and light emitted from a pointer and outputting signal in accordance with the detected position to control section 11.

Imaging section 14 is composed of a device such as a CCD (Charge Coupled Device) camera. One or plural imaging sections 14 are arranged on a predetermined place (for example, on a frame of display section 12), to shoot operators who face display section 12 and output images by which the positions and orientations of parts of each operator, such as operator's face, hand and finger, can be recognized to control section 11. Thereby, an object which an operator is going to operate can be defined and various operations can be conducted on the object, where the various operations includes creation of a new object, movement of a created object, enlargement or reduction of a created object and deletion of a created object.

The structure shown in FIGS. 1A and 1B is one of examples of object display apparatus 10, and the construction may be changed appropriately unless the change deviates from the intention of the present invention. For example, though FIG. 1A illustrates a structure that control section 11 is put inside object display section 10, there may be provided a main body (as a common screen) and control section 11 as separated units, where the main body includes display section 12, operating section 13 and imaging section 14.

Hereafter, description will be given to a control method of an object operation by using object display apparatus 10 of the present example.

Figure 2:
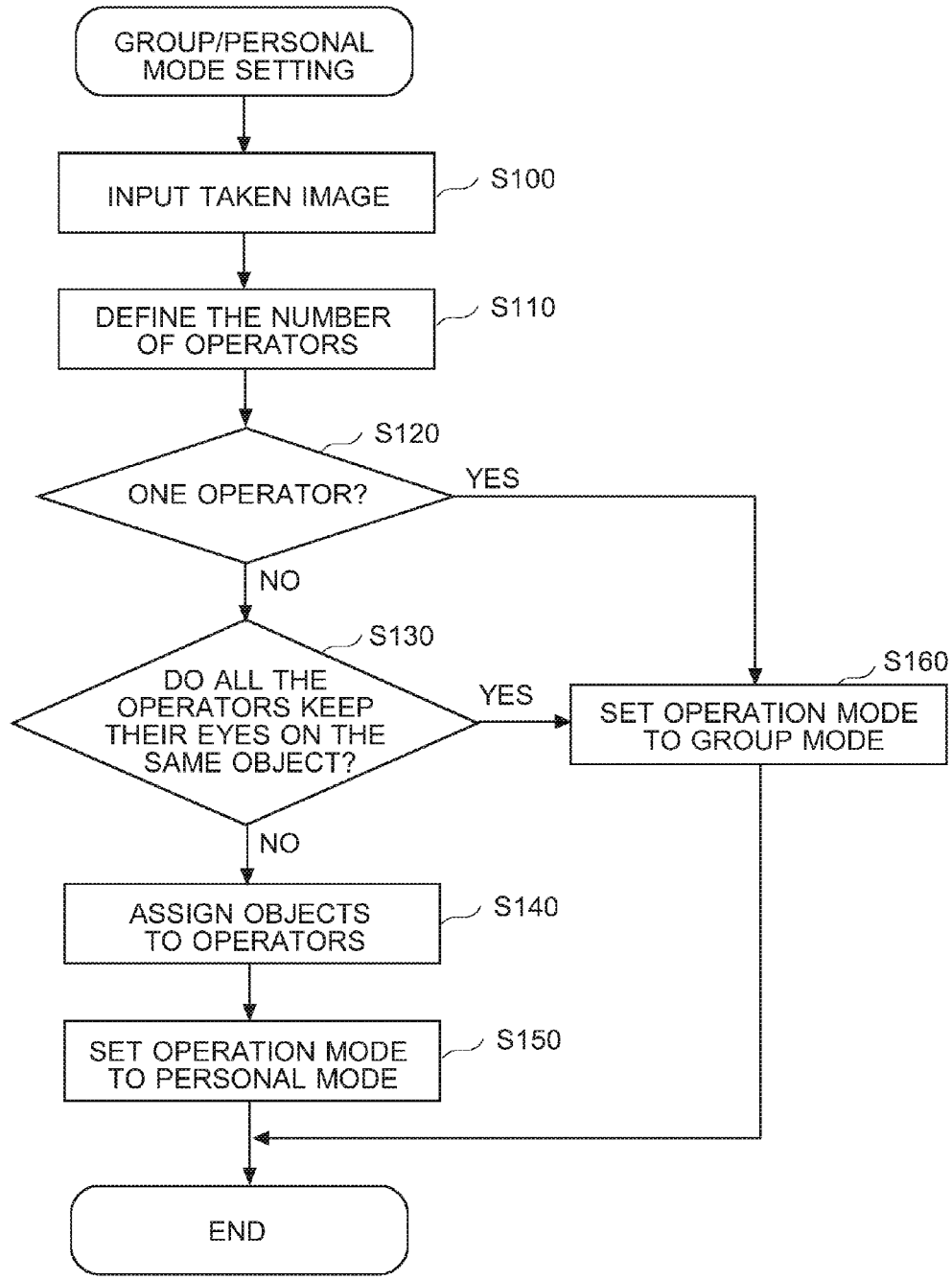
FIG. 2 is a flowchart illustrating steps of an operation control method (setting of group mode or personal mode) relating to one embodiment of the present invention.

First, steps of setting an operation mode of object display apparatus 10 to one of a group mode and a personal mode will be described, with reference to the flowchart shown in FIG. 2.

Imaging section 14 of object display apparatus 10 is operated to take an image of operators facing display section 12. The control section (work-type determining section 11a) obtains the taken image (S100), and analyzes the taken image to define the number of operators facing display section 12 (S110). If the defined number of operators is one (YES of S120), the control section (work-type determining section 11a) determines that the operator conducts a group work since such the situation cannot cause an operation conflict with other operators, and sets the operation mode of object display apparatus 10 to a group mode (S160).

If plural operators are defined (NO of S120), the control section (work-type determining section 11a) determines whether all the plural operators give attention to (keep their eyes on) one and the same object or not, in other words, whether all the plural operators are going to operate one and the same objet or not (S130). Under the situation that all the plural operators give attention to the same object, control section (work-type determining section 11a) determines that the operators conduct a group work since such the situation represents that each of the operators recognizes operations of the other operators and such the situation does not cause a problem even when an operation performed by one of the operators affects the display state of another object. Then, control section (work-type determining section 11a) sets the operation mode of object display apparatus 10 to a group mode (S160).

On the other hand, under the situation that all the plural operators do not give attention the same object, the control section (object assigning section 11b) defines objects observed by the respective operators and assigns the defined objects, which are observed by the operators, to the respective operators (S140). Then, the control section (work-type determining section 11a) sets the operation mode of object display apparatus 10 to a personal mode (S150), since an operation on an object performed by an operator can affect the display state of another object of another operator under the situation.

Next, there will described processing of the control section to be conducted in response to an operation on an object performed by an operator under the situation that the operation mode of object display apparatus 10 is set to one of a group mode and a personal mode. The succeeding processing will be described with reference to the flowcharts shown in FIGS. 3 to 7.

Figure 3:
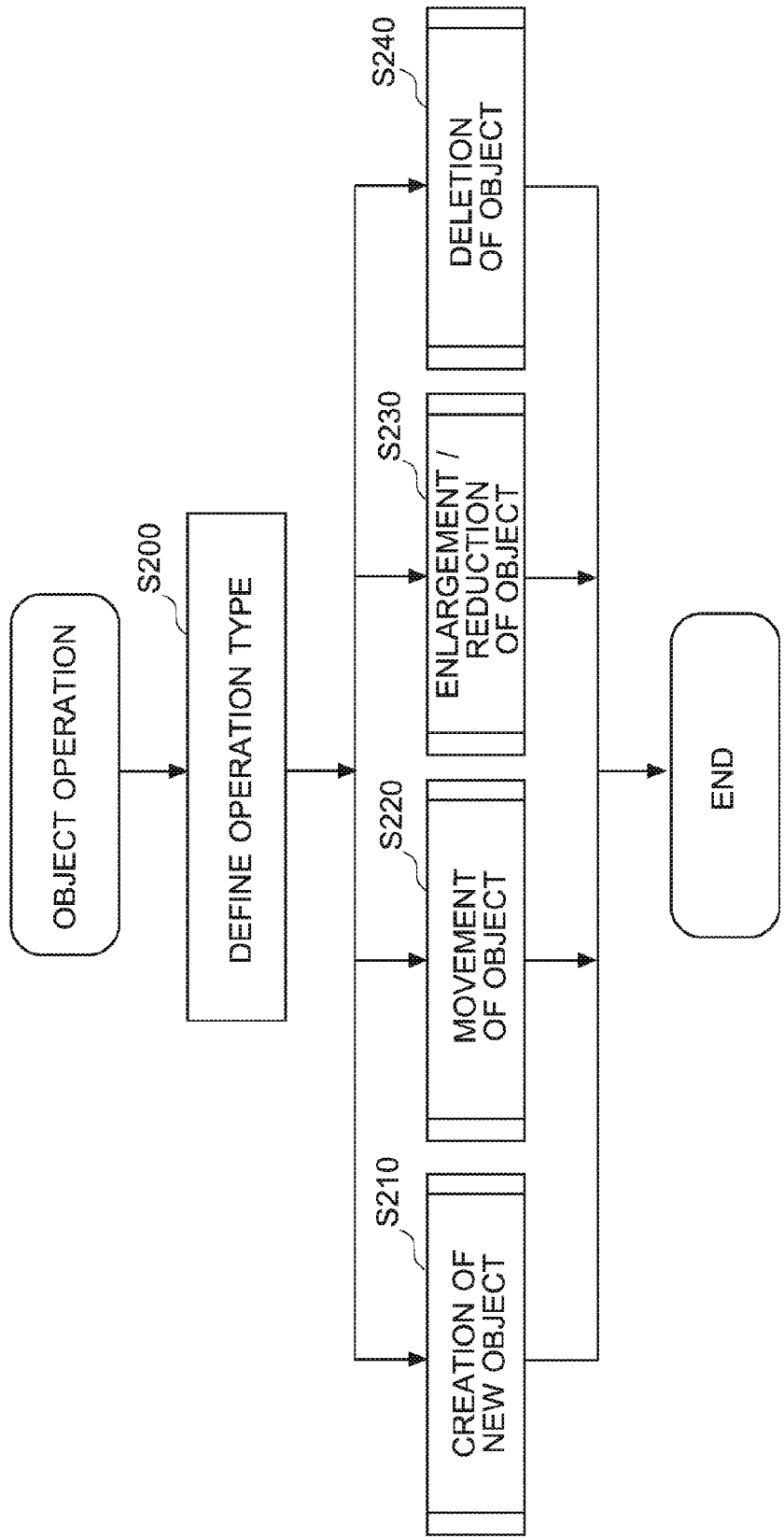
FIG. 3 is a flowchart illustrating steps of an operation control method (object operation) relating to one embodiment of the present invention.

As illustrated in FIG. 3, the control section (operation control section 11c) defines the type of an operation performed by an operator based on signal outputted from operating section 13 or an image outputted from imaging section 14 (S200).

Concretely, as described above, under the situation that an operator points a place on the display section where no object is displayed by gesture or touch, the con section (operation control section 11c) defines the operation as an instruction to create a new object and executes the creation of a new object, which will be described later (S210). Under another situation that an operator points an object on the display section by touch or gesture and moves the position of the touch or gesture, the control section (operation control section 11c) defines the operation as an instruction to move the object and executes the movement of the object, which will be described later (S220). Under another situation that an operator points two points on an object on the display section by touch or gesture and enlarges or reduces the space between the two points, the control section (operation control section 11c) defines the operation as an instruction to enlarge or reduce the object and executes the enlargement or reduction of the object, which will be described later (S230). Under another situation that an operator keeps pointing an object on the display section by touch or gesture for a predetermined period of time or flicks at the object by touch or gesture, the control section (operation control section 11c) defines the operation as an instruction to delete the object and executes the deletion of the object, which will be described later (S240).

Figure 4:
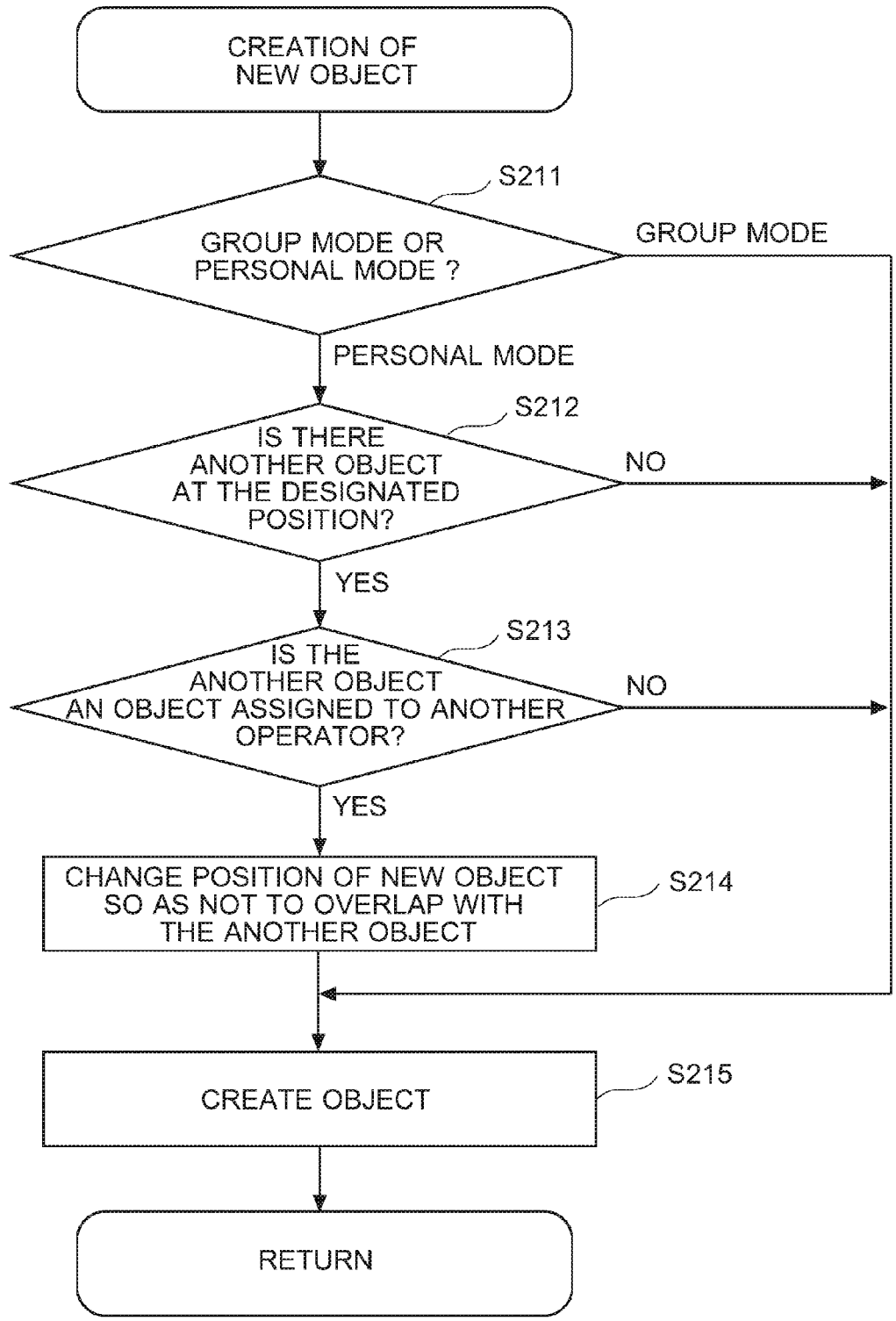
FIG. 4 is a flowchart illustrating steps of an operation control method (creation of a new object) relating to one embodiment of the present invention.

Creation of New Object:

As illustrated in the flowchart of FIG. 4, the control section (operation control section 11c) determines whether the operation mode of object display apparatus 10 has been set to a group mode or personal mode (S211). Under the situation that the operation mode has been set to the group mode, the control section (operation control section 11c) creates a new object at a position designated by the operator's touch or gesture (S215), since this situation does not cause a problem even when an object operation of a certain operator affects the display state of another object.

On the other hand, under the situation that the operation mode has been set to the personal mode, the control section (operation control section 11c) determines whether there is another object at the position designated by the touch or gesture (S212), since this situation can cause an operation conflict with another operator. If there is no object at the designated position, the control section (operation control section 11c) creates a new object at a position designated by the touch or gesture (S215), since the creation of a new object does not affect the display state of another object in this situation.

If there is another object at the designated position, the control section (operation control section 11c) determines whether the another object is an object assigned to another operator (S213), since such the situation can cause an operation conflict with another operator. If the another object is an object assigned to the designating operator, the control section (operation control section 11c) creates a new object at a position designated by the touch or gesture (S215), since the creation of a new object does not affect the other operators.

If the another object is an object assigned to another operator, since the object can affect the display state of the object of the another operator, the control section (operation control section 11c) changes the position where a new object is to be created to a different position such that the new object does not overlap with the another object (for example, in the vicinity of the another object) (S214), and then, creates a new object at the changed position (S215).

As described above, under the situation that the operation mode is set to a personal mode, the control section creates a new object at a position such that the new object does not overlap with an object assigned to another operator if there is another object at the position designated by the operator's touch or gesture and if the another object is an object assigned to another operator. Such the control can prevent the trouble that the new object overlaps with an object assigned to another operator to make operators hard to see the object assigned to another operator, before it happens.

Figure 5:
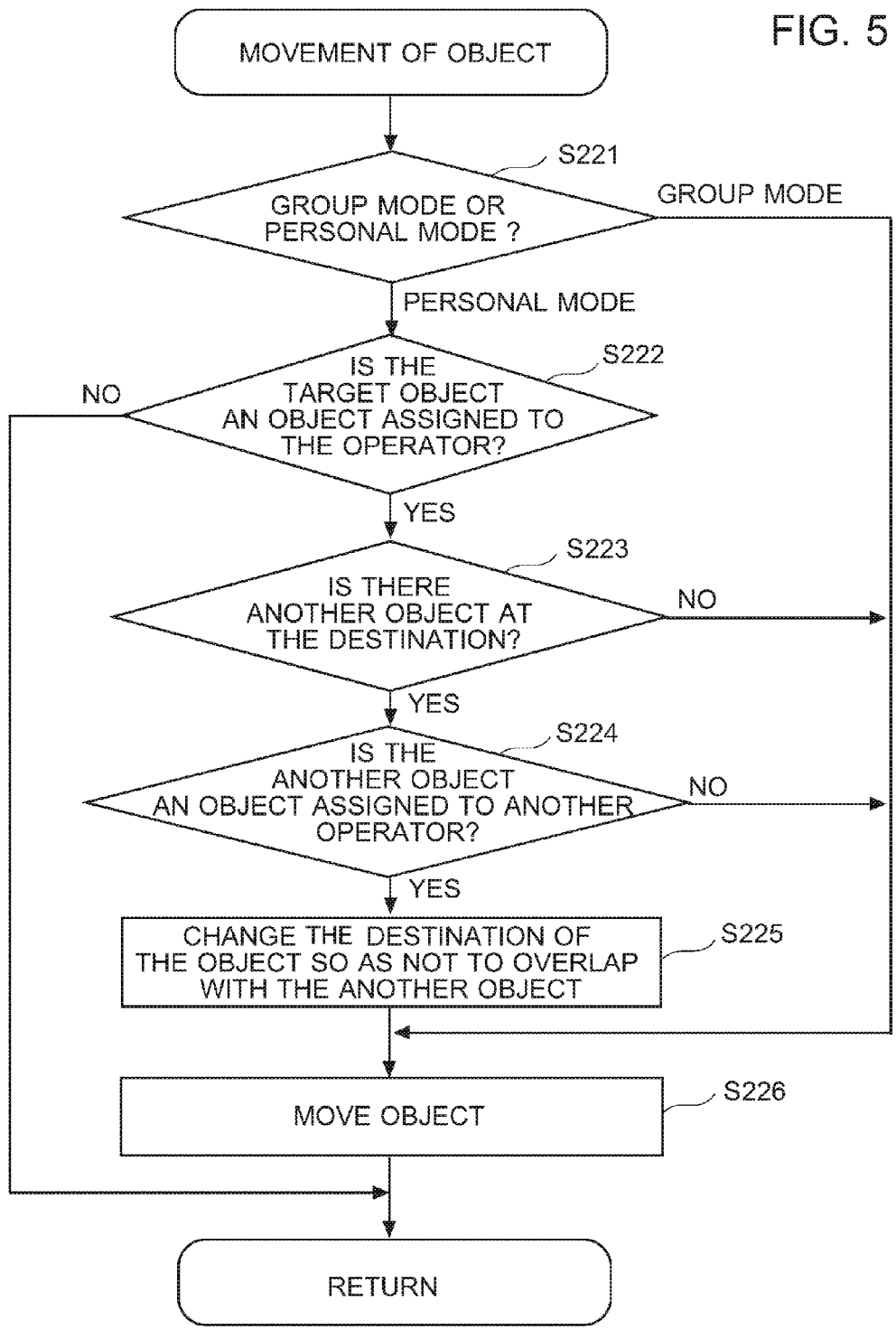
FIG. 5 is a flowchart illustrating steps of an operation control method (movement of an object) relating to one embodiment of the present invention.

Movement of Object:

As illustrated in the flowchart of FIG. 5, the control section (operation control section 11c) determines whether the operation mode of object display apparatus 10 has been set to a group mode or personal mode (S221). Under the situation that the operation mode has been set to the group mode, the control section (operation control section 11c) moves the object according to the instruction given by operator's touch or gesture (S226), since this situation does not cause a problem even when an object operation of a certain operator affects the display state of another object.

On the other hand, under the situation that the operation mode has been set to the personal mode, the control section (operation control section 11c) determines whether an object to be operated (a target object) is an object assigned to the designating operator (S222), since such the situation can cause an operation conflict with another operator. If the target object is not an object assigned to the designating operator, the control section (operation control section 11c) terminates the processing because the operator does not has a right to operate the object.

If the target object is an object assigned to the designating operator, the control section (operation control section 11c) determines whether there is another object at the destination of the movement of the object (S223). If there is no object at the destination position, the control section (operation control section 11c) moves the object according to the instruction given by operator's touch or gesture (S226), since the movement of the object does not affect the display state of another object in this situation.

If there is another object at the destination position, the control section (operation control section 11c) determines whether the another object is an object assigned to another operator (S224). If the another object is an object assigned to the designating operator, the control section (operation control section 11c) moves the object according to the instruction given by operator's touch or gesture (S226), since the movement of the object does not affect the other operators.

If the another object is an object assigned to another operator, the control section (operation control section 11c) changes the destination position of the movement to a different position such that the moved object does not overlap with the another object (for example, in the vicinity of the another object) (S225), and then, moves the object according to the changed position (S226).

As described above, under the situation that the operation mode is set to a personal mode, the control section moves an object to the position such that the object does not overlap with an object assigned to another operator if there is another object at the destination of the object designated by the operator's touch or gesture and if the another object is an object assigned to another operator. Such the control can prevent the trouble that the moved object overlaps with another object to make operators hard to see the object assigned to another operator, before it happens.

Figure 6:
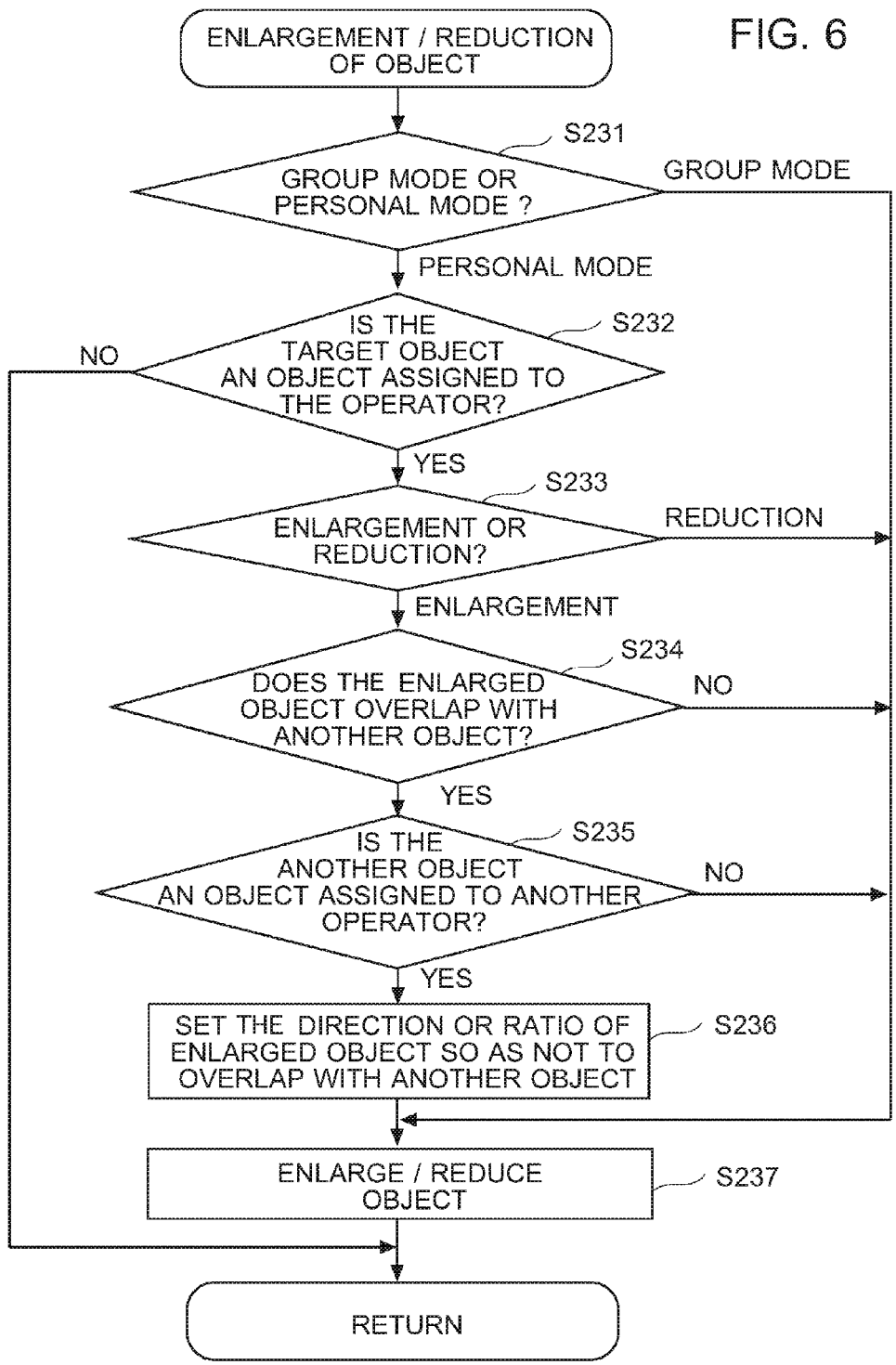
FIG. 6 is a flowchart illustrating steps of an operation control method (enlargement/reduction of an object) relating to one embodiment of the present invention.

Enlargement/Reduction of Object:

As illustrated in the flowchart of FIG. 6, the control section (operation control section 11c) determines whether the operation mode of object display apparatus 10 has been set to a group mode or personal mode (S231). Under the situation that the operation mode has been set to the group mode, the control section (operation control section 11c) enlarges or reduces the object according to the instruction given by operator's touch or gesture (S237), since this situation does not cause a problem even when an object operation of a certain operator affects the display state of another object.

On the other hand, under the situation that the operation mode has been set to the personal mode, the control section (operation control section 11c) determines whether an object to be operated (target object) is an object assigned to the designating operator (S232), since such the situation can cause an operation conflict between another operator. If the target object is not an object assigned to the designating operator, the control section (operation control section 11c) terminates the processing because the operator does not has a right to operate the object.

If the target object is an object assigned to the designating operator, the control section (operation control section 11c) determines whether the operation instructed by operator's touch or gesture is enlargement or reduction (S233). If the operation is reduction, the control section (operation control section 11c) reduces the object according to the instruction given by operator's touch or gesture (S237), since the reduction of the object does not affect the display state of another object in this situation.

If the operation is enlargement, the control section (operation control section 11c) determines whether the enlarged target object can overlap with another object (S234). If the enlarged target object will not overlap with another object, the control section (operation control section 11c) enlarges the target object according to the instruction given by operator's touch or gesture (S237), since the enlargement of the object does not affect the display state of another object in this situation.

If the enlarged target object will overlap with another object, the control section (operation control section 11c) determines whether the another object is an object assigned to another operator (S235). If the another object is an object assigned to the designating operator, the control section (operation control section 11c) enlarges the target object according to the instruction given by operator's touch or gesture (S237), since the enlargement of the object does not affect the other operators.

If the another object is an object assigned to another operator, the control section (operation control section 11c) sets the direction of the enlargement and the ratio of the enlargement such that the enlarged object does not overlap with the another object (S236), and then, enlarges the object according to the direction and the ratio (S237).

As described above, under the situation that the operation mode is set to a personal mode, the control section enlarges an object with adjusting the direction and ratio of the enlargement such that the object does not overlap with an object assigned to another operator if there is another object at the position designated by the operator's touch or gesture and if the another object is an object assigned to another operator. Such the control can prevent the trouble that the enlarged object overlaps with another object to make operators hard to see the object assigned to another operator, before it happens.

As described above, the control section is configured to, when a certain object overlaps with another object on creation of a new object, movement of the object and enlargement of the object, perform creation of a new object, movement of an object and enlargement of an object at a position such that the target object does not overlap with another object. Alternatively, the control section may be configured to display the target object under another object in the situation. There is no need to change the position of the target object in this control.

Figure 7:
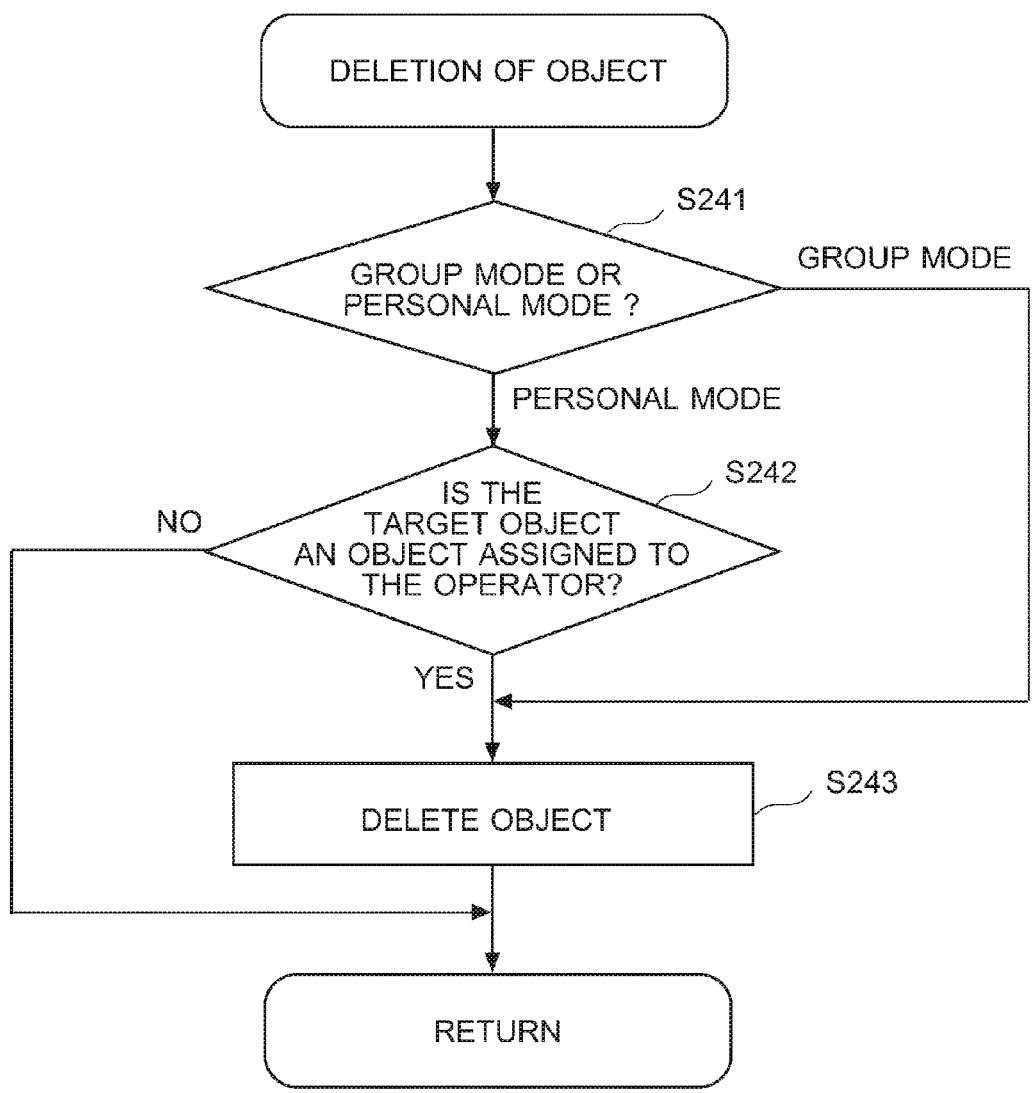
FIG. 7 is a flowchart illustrating steps of an operation control method (deletion of an object) relating to one embodiment of the present invention.

Deletion of Object:

As illustrated in the flowchart of FIG. 7, the control section (operation control section 11c) determines whether the operation mode of object display apparatus 10 has been set to a group mode or personal mode (S241). Under the situation that the operation mode has been set to the group mode, the control section (operation control section 11c) deletes the object according to the instruction given by operator's touch or gesture (S243), since the other operators recognizes the deletion of the object.

On the other hand, under the situation that the operation mode has been set to the personal mode, the control section (operation control section 11c) determines whether an object to be deleted (the target object) is an object assigned to the designating operator (S242), since such the situation can cause an operation conflict with another operator. If the target object is not an object assigned to the designating operator, the control section (operation control section 11c) terminates the processing because the operator does not has a right to operate the object. On the other hand, if the target object is an object assigned to the designating operator, the control section (operation control section 11c) deletes the object according to the instruction given by operator's touch or gesture (S243), since the deletion of the object does not affect the display state of another object in this situation.

As described above, under the situation that the operation mode is set to a personal mode, the control section deletes an object if the target object is an object assigned to the designating operator. Such the control can prevent the trouble that an object is deleted against another operator's will, before it happens.

The above descriptions of the flow mainly illustrated about the control of the object display apparatus in a personal mode. On the other hand, under the situation that an operated target object overlaps with another object in a group mode, the control section may put the target object on another object or may move the both objects such that the target object and the another object do not overlap with each other.

Figure 8:
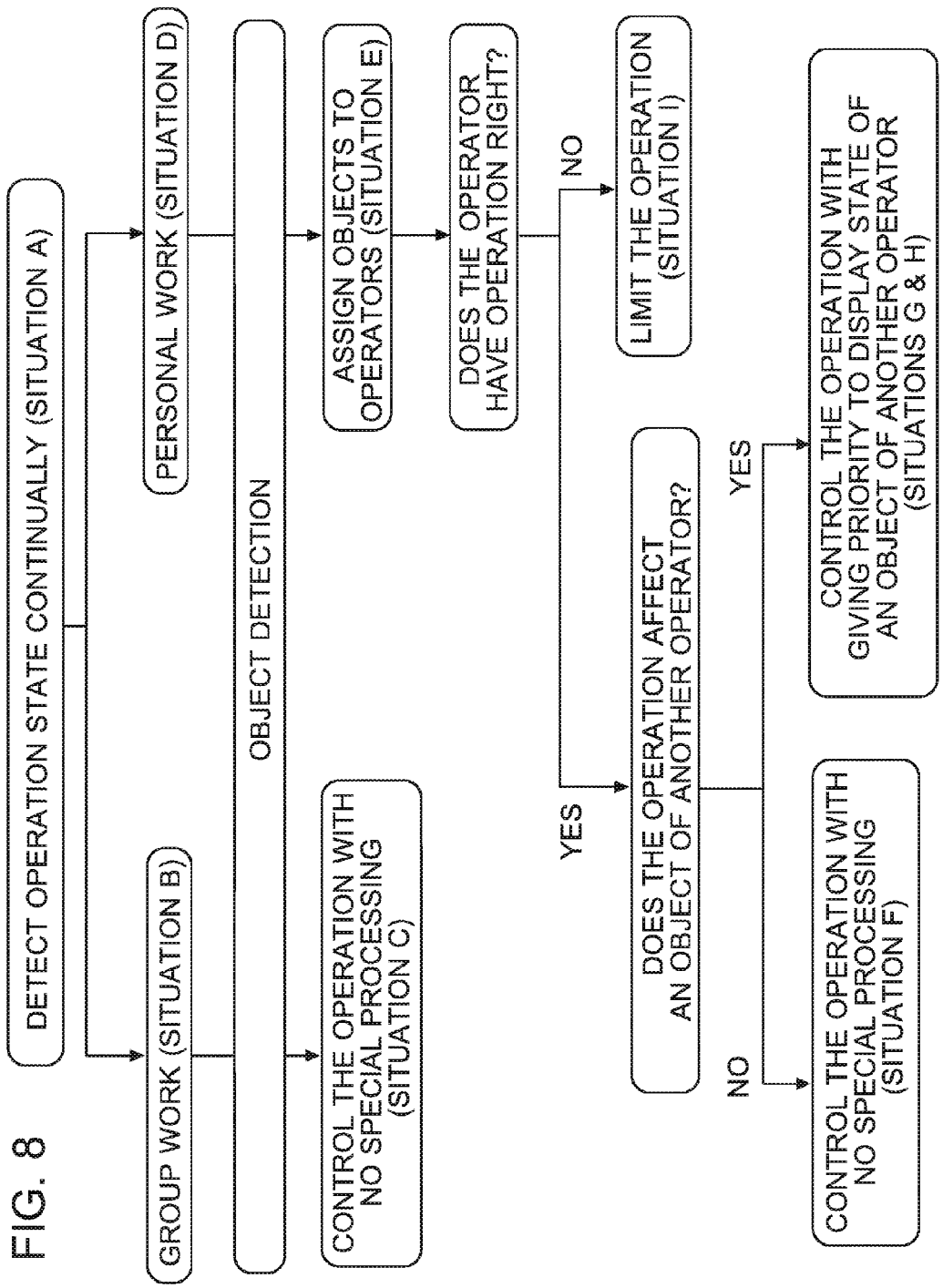
FIG. 8 is a schematic diagram illustrating a concrete example of an operation control method relating to one embodiment of the present invention.

Hereinafter, an object operation will be described in more detail with citing a concrete example. FIG. 8 illustrates an example of an operation under the situation that there are two operators in front of object display apparatus 10. FIGS. 9A to 9I are diagrams illustrating situations A to I of FIG. 8, respectively.

Figure 9A:
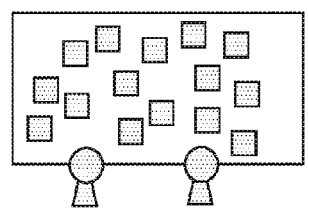
FIGS. 9A to 9I are schematic diagrams illustrating a concrete example of operation control method relating to one embodiment of the present invention.
Figure 9B:
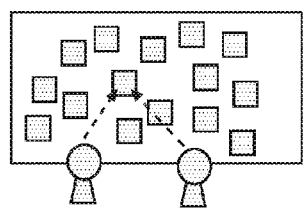
Figure 9D:
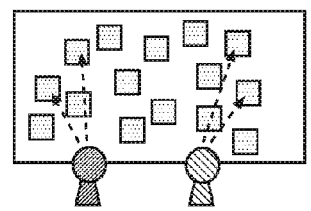
Figure 9C:
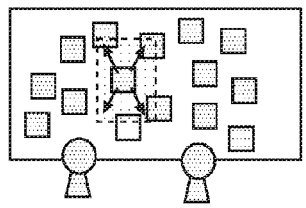
Figure 9E:
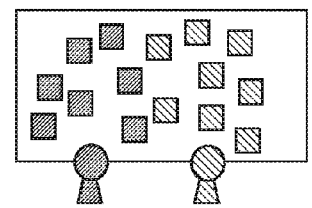
Figure 9F:
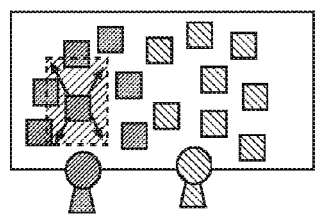
Figure 9G:
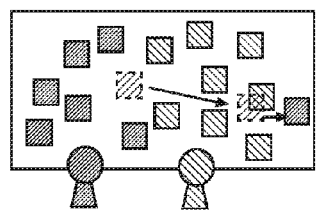
Figure 9H:
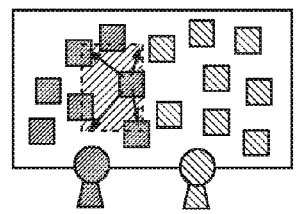
Figure 9I:
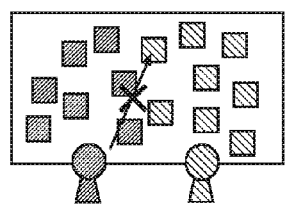

In situation A shown in FIGS. 8 and 9A, control section 11 (work-type determining section 11a) determines whether the two operators keep their eyes on the same object, based on the orientation and movement of each of the operators. If it is determined that the two operators keep their eyes on the same object, the control section 11 determines that the operators are conducting a group work (as shown in situation B shown in FIGS. 8 and 9B), because it can be considered that the two operators communicate with each other under the situation. After that, control section 11 (object assigning section 11b) detects an object on which each of the operators keeps their eyes. Herein, since an operation to be performed on the detected object can affect any other objects equally, the control section 11 controls the operation with no special processing (as shown in situation C shown in FIGS. 8 and 9C).

On the other hand, if it is determined that the two operators do not keep their eyes on the same object, the control section 11 determines that each of the operators is conducting a personal work (as shown in situation D shown in FIGS. 8 and 9D), since it can be considered that the two operators do not communicate with each other regarding the objects under the situation. Then, the control section 11 (object assigning section 11b) detects an object on which each of the operators keeps their eyes, and assigns the detected objects to the corresponding operators (as shown in situation E shown in FIGS. 8 and 9E). In FIGS. 9E to 9I, different hatching types are used for representing objects assigned to different operators.

After that, the control section 11 (operation control section 11c) determines whether the operator conducting the object operation has an operation right. If the operator does not have the operation right, the control section limits the operation of the operator. For example, as illustrated by situation I shown in FIGS. 8 and 9I, when the operator at the left-hand side is going to operate an object assigned to the operator at the right-hand side, the control section 11 ignores the operation.

When the operator has the operation right, the control section 11 (operation control section 11c) determines whether an object operation of one of the operators can affect another object assigned to the other operator. On determining that the object operation do not affect the another object, the control section 11 controls the operation with no special processing. For example, as illustrated by situation F shown in FIGS. 8 and 9F, when the operator at the left-hand side enlarges an object assigned to the operator oneself, the control section does not limit the operation, since the enlarged object do not overlap with objects assigned to the operator at the right-hand side.

On determining that the object operation can affect the another object, the control section 11 control the operation with giving priority to the display state of the another object assigned to the another operator. For example, as illustrated by situation G shown in FIGS. 8 and 9G, when the operator at the left-hand side is going to move an object assigned to the operator by oneself above an object assigned to the operator at the right-hand side, such the movement makes operators hard to see the object assigned to operator at the right-hand side. Therefore, the control section 11 moves the target object to a position where the moved target object do not overlap with the object assigned to the operator at the right-hand side. As another situation, as illustrated by situation shown in FIGS. 8 and 9H, when the operator at the left-hand side is going to enlarge an object assigned to the operator by oneself so as to overlap with another object assigned to the operator at the right-hand side, such the enlargement makes operators hard to see the object assigned to operator at the right-hand side. Therefore, the control section adjusts the direction and the ratio of the enlargement such that the enlarged target object do not overlap with the object assigned to the operator at the right-hand side.

As another example, under the situation that there are three or more operators in front of object display apparatus 10, at least one of the operators is conducting a personal work and the other (two or more) operators are conducting a group work, the control section (work-type determining section 11a) sets the operation mode of object display apparatus 10 to a personal mode. Further, the control section 11 (object assigning section 11b) defines each of the two or more operators as an operator conducting another personal work and assigns the corresponding objects also to the two or more operators, respectively. Then, even when the control section 11 (operation control section 11c) determines that an object operation of one of the operators can affect an object assigned to another operator, the control section 11 (operation control section 11c) does not limit the object operation as far as the one and the another operator are included in the two or more operators conducting the group work.

As described above, the control section 11 is configured to, when an object operation of an operator can affect another object assigned to another operator in a personal mode, control the object operation with putting limit on the operation, for example, to display the object with giving priority to the display state of an object assigned to another operator. Such the control can avoid an operation conflict which can be caused in a personal mode in which each operators do not recognizes the other operators, before it happens, which can significantly enhance the operability of the object display apparatus 10.

The present invention should not be restricted to the above described example, but its configuration and control are arbitrarily changeable without departing from the spirit and scope of the present invention.

For example, the above examples show, as examples of object operations, creation of an object, movement of an object, enlargement/reduction of an object and deletion of an object. Further, the present example can be applied similarly to arbitrary operations such as changing an object in color and changing characters in font (cf. boldface).

The invention claimed is:

1. An object display apparatus comprising:
a display section configured to display objects thereon;
an operating section configured to allow one or a plurality of operators to operate the objects displayed on the display section;
a work-type determining section configured to set an operation mode of the object display apparatus to a group mode when the one or the plurality of operators are conducting a group work on one object displayed on the display section, and the work-type determining section is configured to set the operation mode of the object display apparatus to a personal mode when each of a plurality of operators is conducting a personal work on a corresponding object displayed on the display section;
an object assigning section configured to assign a corresponding object displayed on the display section to each of the plurality of operators, when the operation mode is set to the personal mode; and
an operation control section configured to, when the operation mode is set to the personal mode:
determine whether an operation performed on one of the objects displayed on the display section by one of the plurality of operators can affect a display state of another object assigned to another of the plurality of operators, and
control the operation performed by the one of the plurality of operators with putting a limit on the operation, in response to determining that the operation can affect the display state of the another object, and
when the operation mode is set to the group mode, the operation control section is configured to control the operation performed by the one of the plurality of operators without putting a limit on the operation.

2. The object display apparatus of claim 1,
wherein the work-type determining section is configured to set the operation mode to the group mode when determining that all of the plurality of operators are going to operate a same object displayed on the display section.

3. The object display apparatus of claim 1,
wherein the work-type determining section is configured to set the operation mode to the personal mode when determining that each of at least one of three or more operators is conducting a personal work on a corresponding object displayed on the display section and the other operators are conducting a group work on another object displayed on the display section, where the other operators are two or more operators,
the object assigning section is configured to, in response to the operation mode being set to the personal mode, decide each of the other operators as an operator conducting a personal work and assign a corresponding object displayed on the display section to each of the other operators, and
the operation control section is configured to control the operation performed by the one of the plurality of operators without limitation, on the one of the plurality of operators and the another operator being included in the other operators.

4. The object display apparatus of claim 1,
wherein the operation control section is configured to
determine whether the one of the plurality of operators has a right to perform the operation or not and
change the operation depending on a result of determining whether the one of the plurality of operators has a right to perform the operation or not.

5. The object display apparatus of claim 1,
wherein the operation control section is configured to, when determining that the one of the objects on which the operation has been performed overlaps with the another object in the personal mode, display the another object with giving priority to the one of the objects to the another object.

6. The object display apparatus of claim 1,
wherein the operation includes one of a creation of an object on the display section, a movement of an object displayed on the display section, an enlargement or reduction of an object displayed on the display section and a deletion of an object displayed on the display section.

7. An operation control method to be performed in an object display apparatus including a display section configured to display objects thereon and an operating section configured to allow one or a plurality of operators to operate the objects displayed on the display section, the method comprising:
setting an operation mode of the object display apparatus to a group mode when the one or the plurality of operators are conducting a group work on one object displayed on the display section, and setting the operation mode of the object display apparatus to a personal mode when each of a plurality of operators is conducting a personal work on a corresponding object displayed on the display section;
assigning a corresponding object displayed on the display section to each of the plurality of operators, when the operation mode is set to the personal mode;
when the operation mode is set to the personal mode:
determining whether an operation performed on one of the objects displayed on the display section by one of the plurality of operators can affect a display state of another object assigned to another of the plurality of operators; and
controlling the operation performed by the one of the plurality of operators with putting a limit on the operation, in response to determining that the operation can affect the display state of the another object, and
when the operation mode is set to the group mode, controlling the operation performed by the one of the plurality of operators without putting a limit on the operation.

8. The operation control method of claim 7,
wherein the setting the operation mode includes setting the operation mode to the group mode when determining that all of the plurality of operators are going to operate a same object displayed on the display section.

9. The operation control method of claim 7,
wherein the setting the operation mode includes setting the operation mode to the personal mode when determining that each of at least one of three or more operators is conducting a personal work on a corresponding object displayed on the display section and the other operators are conducting a group work on another object displayed on the display section, where the other operators are two or more operators, the assigning a corresponding object displayed on the display section to each of the plurality of operators includes, in response to the operation mode being set to the personal mode, deciding each of the other operators as an operator conducting a personal work and assigning a corresponding object displayed on the display section to each of the other operators, and the controlling the operation performed by the one of the plurality of operators with putting a limit on the operation includes controlling the operation performed by the one of the plurality of operators without limitation, when the one of the plurality of operators and the another operator is included in the other operators.

10. The operation control method of claim 7,
wherein the determining whether the operation performed when one of the objects displayed on the display section by one of the plurality of operators can affect the display state of the another object includes determining whether the one of the plurality of operators has a right to perform the operation or not, and the controlling the operation performed by the one of the plurality of operators with putting a limit on the operation includes changing the operation depending on a result of determining whether the one of the plurality of operators has a right to perform the operation or not.

11. The operation control method of claim 7,
wherein the controlling the operation performed by the one of the plurality of operators with putting a limit on the operation includes, when determining that the one of the objects on which the operation has been performed overlaps with the another object, displaying the another object with giving priority to the one of the objects to the another object.

12. The operation control method of claim 7,
wherein the operation includes one of a creation of an object on the display section, a movement of an object displayed on the display section, an enlargement or reduction of an object displayed on the display section and a deletion of an object displayed on the display section.

13. A non-transitory computer-readable storage medium storing an operation control program to be executed in an object control apparatus including a display section configured to display objects thereon and an operating section configured to allow one or a plurality of operators to operate the objects displayed on the display section, the operation control program causing a processor of the object display apparatus to execute processing comprising:

setting an operation mode of the object display apparatus to a group mode when the one or the plurality of operators are conducting a group work on one object displayed on the display section, and setting the operation mode of the object display apparatus to a personal mode when each of a plurality of operators is conducting a personal work on a corresponding object displayed on the display section;

assigning a corresponding object displayed on the display section to each of the plurality of operators, when the operation mode is set to the personal mode;

when the operation mode is set to the personal mode:
determining whether an operation performed on one of the objects displayed on the display section by one of the plurality of operators can affect a display state of another object assigned to another of the plurality of operators; and controlling the operation performed by the one of the plurality of operators with putting a limit on the operation, in response to determining that the operation can affect the display state of the another object, and when the operation mode is set to the group mode controlling the operation performed by the one of the plurality of operators without putting a limit on the operation.

14. The non-transitory computer-readable storage medium of claim 13,
wherein the setting the operation mode includes setting the operation mode to the group mode on determining that all of the plurality of operators are going to operate a same object displayed on the display section.

15. The non-transitory computer-readable storage medium of claim 13,
wherein the setting the operation mode includes setting the operation mode to the personal mode when determining that each of at least one of three or more operators is conducting a personal work on a corresponding object displayed on the display section and the other operators are conducting a group work on another object displayed on the display section, where the other operators are two or more operators, the assigning a corresponding object displayed on the display section to each of the plurality of operators includes, in response to the operation mode being set to the personal mode, deciding each of the other operators as an operator conducting a personal work and assigning a corresponding object displayed on the display section to each of the other operators, and the controlling the operation performed by the one of the plurality of operators with putting a limit on the operation includes controlling the operation performed by the one of the plurality of operators without limitation, when the one of the plurality of operators and the another operator being included in the other operators.

16. The non-transitory computer-readable storage medium of claim 13,
wherein the determining whether the operation performed on one of the objects displayed on the display section by one of the plurality of operators can affect the display state of the another object includes determining whether the one of the plurality of operators has a right to perform the operation or not, and the controlling the operation performed by the one of the plurality of operators with putting a limit on the operation includes changing the operation depending on a result of determining whether the one of the plurality of operators has a right to perform the operation or not.

17. The non-transitory computer-readable storage medium of claim 13,
wherein the controlling the operation performed by the one of the plurality of operators with putting a limit on the operation includes, when determining that the one of the objects on which the operation has been performed overlaps with the another object, displaying the another object with giving priority to the one of the objects to the another object.

18. The non-transitory computer-readable storage medium of claim 13,
wherein the operation includes one of a creation of an object on the display section, a movement of an object displayed on the display section, an enlargement or reduction of an object displayed on the display section and a deletion of an object displayed on the display section.

* * * * *